US005906858A

United States Patent [19]

Huber et al.

[11] Patent Number: 5,906,858

[45] **Date of Patent: *May 25, 1999**

[54] METHOD AND APPARATUS FOR CONVEYING A PULVERULENT MATERIAL BY MEANS OF AN INJECTOR

[75] Inventors: Guido Huber, Schindellegi; Hans-Jörg Nussbaumer, Wagen; Felix Walser, Hinwil, all of Switzerland

[73] Assignee: Elpatronic AG, Bergdietikon, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,606

[22] Filed: Aug. 7, 1996

[30] Foreign Application Priority Data

Sep. 18, 1995 [CH] Switzerland .......................... 02 625/95

[51] Int. Cl.[6] .............................. B05D 1/12; B65G 51/16; B65G 53/04

[52] U.S. Cl. ................................ 427/180; 406/14; 406/94

[58] Field of Search .............................. 427/180; 406/14, 406/94

[56] References Cited

U.S. PATENT DOCUMENTS

| | | | |
|---|---|---|---|
| 4,085,976 | 4/1978 | Edwards et al. | 302/25 |
| 4,279,549 | 7/1981 | Hanrot et al. | 406/14 |
| 4,290,555 | 9/1981 | Suwa et al. . | |
| 4,661,379 | 4/1987 | Frei et al. | 427/181 |
| 5,015,126 | 5/1991 | Kramer | 406/152 |
| 5,131,350 | 7/1992 | Buschor . | |
| 5,299,694 | 4/1994 | Rambaud | 209/135 |

FOREIGN PATENT DOCUMENTS

| | | |
|---|---|---|
| 636420 | 2/1995 | European Pat. Off. . |
| A-0 636 420 | 2/1995 | European Pat. Off. . |
| A 20 26 498 | 12/1970 | Germany . |
| A 44 03 022 | 9/1994 | Germany . |
| A 44 09 493 | 9/1994 | Germany . |
| A 63-252 825 | 10/1988 | Japan . |
| A 7-187 387 | 7/1995 | Japan . |

*Primary Examiner*—Shrive Beck
*Assistant Examiner*—Bret Chen
*Attorney, Agent, or Firm*—McCormick, Paulding & Huber

[57] ABSTRACT

An injector for conveying a pulverulent material is supplied with entraining air via a line and with dosing air via another line. Dosing air and entraining air are kept constant in their total rate of flow by a flow controller. This yields a particularly homogeneous powder/air mixture, which is particularly advantageous in the conveying of coating powder for coating welded seams on can bodies.

4 Claims, 1 Drawing Sheet

METHOD AND APPARATUS FOR CONVEYING A PULVERULENT MATERIAL BY MEANS OF AN INJECTOR

BACKGROUND OF THE INVENTION

The invention relates to a method for conveying a pulverulent material by means of an injector, in which, after the material has been introduced into an entraining gas, dosing gas is added. The invention also relates to an application of the method for coating the weld seams of can bodies, an apparatus for conveying a pulverulent material by means of an injector, and an application of the apparatus.

It is known to convey pulverulent materials by means of an injector. In the conveying of coating powder in particular, the use of an injector in which dosing air is added after the coating powder is introduced into the entraining air is also known. FIG. 1 shows such an injector 1 in which air is injected through a jet 4 into the injector chamber 5, which has a powder inlet 6 for introducing powder into the entraining stream from a feed container which is not shown. The powder entrained in the airstream passes into the chamber 10, where dosing air is added to the powder stream through a connection 8 and a duct 9. The powder/air mixture is fed to the coating point by a hose and pipework connected to the hose coupling 11.

Control of the entraining air and dosing air, which are taken from a conventional compressed-air source, has, in the past, been effected either by separate control valves or by two valves arranged on a common shaft so that only one control knob has to be operated in order to set both valves. Especially in applications where the powder/air mixture has to travel a relatively long distance through pipework to the coating point (e.g. a distance of 1 meter or more) or where a very homogeneous powder/air mixture is required, the control of entraining air and dosing air has proved very difficult. The balance between entraining air (which determines the quantity of powder drawn from the feed container) and dosing air (which affects the velocity of the powder/air mixture in the piping and the homogeneity of the mixture) is very difficult to set correctly if the conveying distances are long and/or a high standard of homogeneity is required, and even with two coupled control valves it has been found that satisfactory control is possible only in a narrow operating range.

Particularly awkward conditions occur in the known coating of welded seams of can bodies at the end of a body welding machine. On the one hand, the injector has to send the powder along an extended line, as it has to be routed through the welding machine and along the body forming and welding path. On the other hand, to obtain a satisfactory coating of the welded seam, a constant quantity of powder, homogeneously distributed, must reach each can body as it is conveyed past the coating nozzle. The can bodies are conveyed at a rate of e.g. 18 cans per second (ie. for a standard size of can, at approximately 100 m/min), possibly leading to a large number of cans receiving an insufficient coating if any fluctuations occur, even momentarily, in the homogeneity of the powder/air mixture or in the absolute quantity of powder deposited.

SUMMARY OF THE INVENTION

It is therefore an underlying object of the invention to provide a way of coating by means of an injector in which these drawbacks do not occur or are at least mitigated, and in which excellent coating quality can be obtained even under very awkward conditions, in particular in the coating of welded seams of can bodies.

This object can be achieved in a method of the kind mentioned at the outset by drawing the entraining gas and the dosing gas from a source supplying a constant rate of flow of gas to the injector.

It has been found that supplying the injector from a constant source (a source which is regulated so that the quantity of air supplied to the injector is constant at all times) solves the problem. The constant source ensures that the sum of entraining gas and dosing gas is always constant, and it has been found that this allows a constant flow velocity in the conveyor line and a constant powder discharge to be achieved.

The constant source may supply an injector with a fixed setting, that is to say an injector in which adjustment can be made only e.g. by replacing the jet, or by modifying the dosing gas duct. Preferably, however, an external control of the delivery of the injector is provided, ie. a control located outside the injector, acting on only one of the gas flows, preferably the dosing gas. The constant source ensures that when an alteration to the setting (a change in throttling) of one gas flow occurs, a corresponding alteration (increase or decrease) of the other gas flow takes place automatically.

Preferably, the method is used for the coating of can bodies, but it may also be used for other purposes and for other materials to be conveyed.

An apparatus for realising the object has a source supplying a constant gas flow and the source is connected to the entraining gas and the dosing gas connections of the injector. The preferred application of this apparatus is for the powder coating of can bodies, but other applications in which a material is conveyed by means of an injector are also possible.

BRIEF DESCRIPTION OF THE DRAWINGS

Embodiments will now be commented on in detail with reference to the drawings, in which.

DESCRIPTION OF THE PREFERRED EMBODIMENTS

Figure 1:
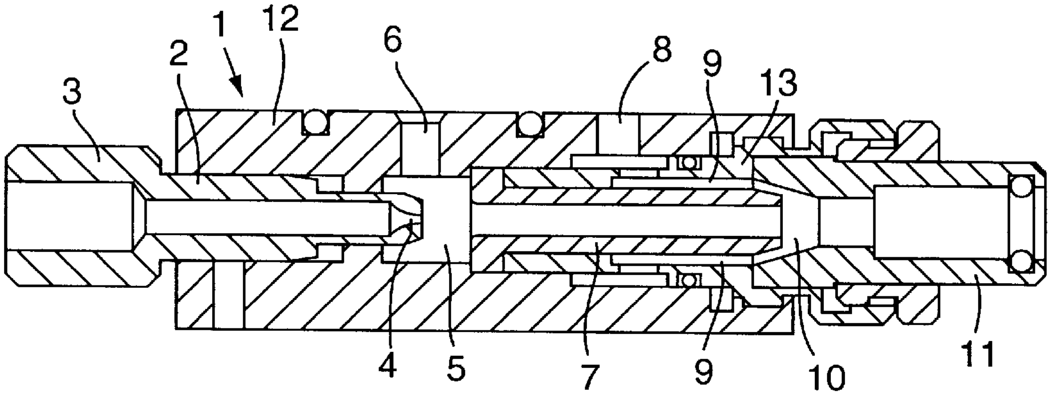
FIG. 1 shows an injector of basically known construction, viewed in section.

The injector 1 of FIG. 1, which is shown as an example of a basically known injector, has a housing 12. Formed inside the housing is the injector chamber 5 into which the jet 4 of the injector projects. The jet 4 is supplied with gas, usually compressed air, via the connection 3, and this compressed-air flow forms the entraining airflow. A connection 6, through which the material to be conveyed is supplied to the injector chamber 5 from a feed container (not shown), opens into the injector chamber, in which a partial vacuum is created by the entraining airstream. The material to be conveyed is entrained by the entraining airflow. The entraining airflow passes through a sleeve 7. Outside this sleeve, a connection 8 for the dosing gas, which again is usually compressed air, is provided in the housing 12. Through the duct 9 formed between the sleeve 7 and a guide sleeve 13 surrounding part of the sleeve 7 with clearance, dosing air is supplied to the chamber 10, into which the entraining airflow also passes. The two airflows merge, and pass out of the injector 1 through the coupling 11, which is connected to a line which conveys the powder/air mixture to the point of use.

In the preferred application for the conveying of coating powder to coat the welded seams of can bodies, the coating powder is transferred by the injector by means of compressed air (at a pressure in the range of e.g. 6 to 10 bar) from the feed container, which may have a capacity of e.g. 3 to 4 kg of powder, into a line which, in a known manner, enters the can welding machine at the rounding unit, passes through the welding zone and then terminates at a nozzle which sprays the powder/air mixture on to the internal welded seam of the can, in order to provide the seam with a coating. This process is usually assisted by giving the coating powder an electrostatic charge. The powder deposited on the welded seam is heated to form a cohesive coating which hardens upon cooling. Suitable coating powders are known and are commercially available, and the coating process, as such, is known. As has already been mentioned, it is very tricky to control the entraining air and dosing air so that sufficient powder, homogeneously distributed, is conveyed to the nozzle with sufficient velocity (approximately 12 m/sec) to provide an even coating.

Figure 2:
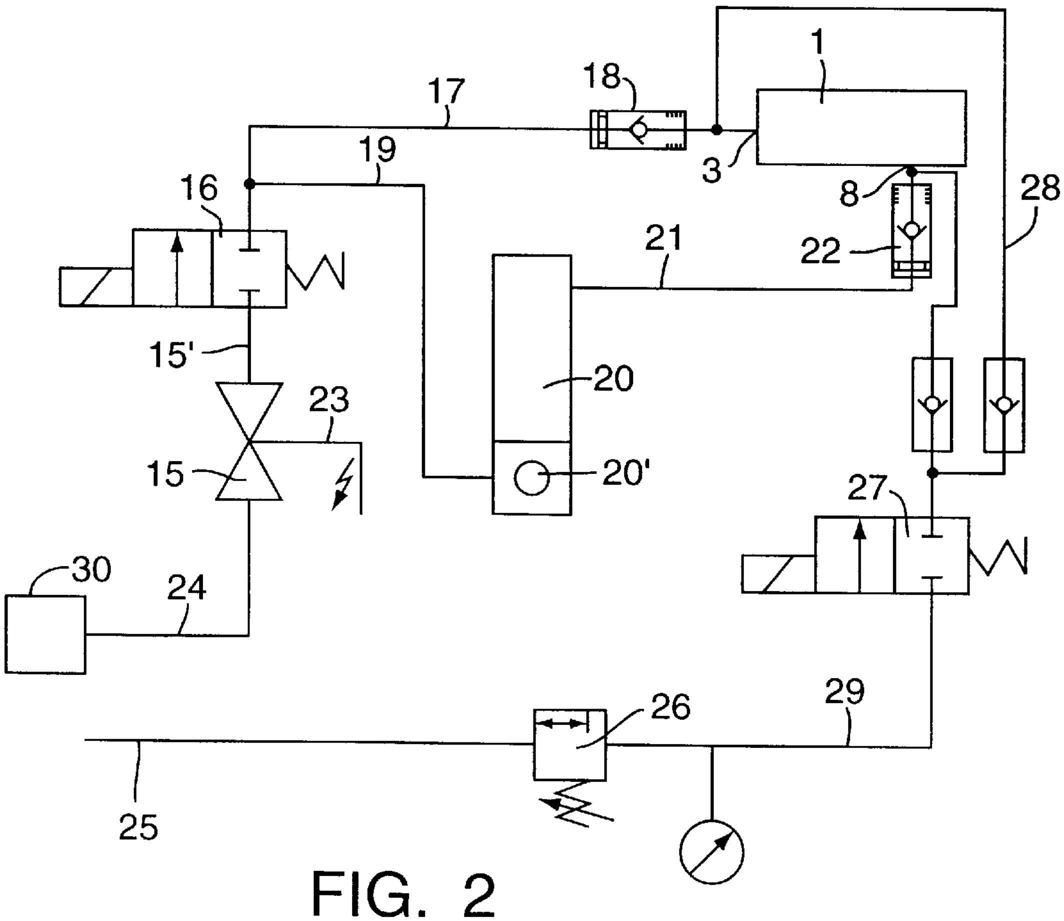
FIG. 2 is a pneumatic diagram to illustrate both the method and the apparatus.

In accordance with the invention, the entraining air and dosing air are drawn from one source at a constant rate of flow. This means that the source varies the air pressure so that the rate of discharge is kept constant. FIG. 2 is a pneumatic diagram in which the injector 1 with its entraining air connection 3 and dosing air connection 8 is represented as a block. The entraining air and dosing air are supplied from a single compressed-air source 30 to which a regulating valve 15, which delivers a constant air flow at its outlet line 15', is connected by a line 24. The air flow can be preset by an electrical control signal received via the control line 23 from a control unit (not shown). The valve 15 will then automatically maintain a constant air flow. Such a valve—which may also be referred to as a flow controller—may for example by a Type F 201 C Flow Controller supplied by the Company Bronkhorst of the Netherlands.

A switchable valve 16 may be provided as a main valve downstream of the flow controller 15 so that the air supply to the injector can be switched on and off. The airflow discharged by the flow controller 15 then passes (a) via the line 17 and non-return valve 18 to the entraining air connection of the injector 1; and (b) via lines 19 and 21 and non-return valve 22 to the dosing air connection 8. An adjustable flow controller 20 with a control element 20' is preferably provided in the dosing air branch to enable the dosing air to be adjusted to suit individual conveying conditions. If these conditions are constant, the controller could be omitted.

The flow controller 15 keeps the total air flow for powder conveying constant. The higher the set value of the control on the line 23, the higher the velocity of the powder in the powder line. The constant air flow is made up of entraining air and dosing air combined. The dosing air is adjusted by means of the flow controller 20. If the dosing air is boosted, less powder is conveyed, at the same velocity. If the dosing air is throttled back, more powder is conveyed, at the same velocity, as more entraining air is delivered. The dosing air is admitted as a balancing flow to the injector downstream of the powder feed, the sum of entraining air and dosing air in the injector 1 remaining constant. For the dosing air controller 20, a standard commercial flow control supplied by Vögtlin AG, Switzerland, may be used.

To clean the injector 1 when not in use, a flushing line 25 may be provided, through which flushing air can be supplied to the injector via a pressure regulator 26 and main valve 27 through lines 29 and 28.

We claim:

1. Method for conveying a pulverulent material by means of an injector comprising the steps of:

providing a constant rate of flow of gas by directing the gas flow from a pressurized source through a regulating valve flow controller, directing one portion of the constant rate of flow of gas as an entraining gas flow into the injector and introducing pulverulent material into the entraining gas flow, employing the remaining portion of the constant rate of flow of gas as a dosing gas flow by adding the dosing gas into the flow of entraining gas and pulverulent material within the injector, and controlling the amount of flow of entraining gas and the amount of pulverulent material being conveyed in inverse relationship to the amount of flow of dosing gas by adjusting the amount of flow of dosing gas.

2. The method of claim 1 further comprising the step of:

conveying the pulverulent material contained in the entraining gas and the dosing gas to a device for coating the welded seams of can bodies.

3. Apparatus for conveying a pulverulent material with an injector comprising:

a regulating valve flow controller having an outlet for supplying a constant rate of flow of gas from a pressurized gas source to the injector, an entraining gas conduit coupled to the outlet of the regulating valve flow controller for supplying a portion of the gas from the regulating valve flow controller to the injector as an entraining gas flow, means for introducing a pulverulent material into the entraining gas flow, a dosing gas conduit also coupled to the outlet of the regulating valve flow controller for separately adding the remaining portion of the gas from the regulating valve flow controller to the injector as a dosing gas, and means associated with the dosing gas conduit for adjusting the flow of the dosing gas in order to adjust the flow of entraining gas and the amount of pulverulent material being conveyed in inverse relationship to the amount of flow of dosing gas.

4. Apparatus according to claim 3 further comprising:

means for conveying the pulverulent material from the injector to means for coating the welded seams of can bodies.

* * * * *